K. KUROKI.
FISH BAIT.
APPLICATION FILED DEC. 18, 1916.

1,235,331.

Patented July 31, 1917.

INVENTOR
KAIKO KUROKI

BY
[signature]

ATT'Y.

UNITED STATES PATENT OFFICE.

KAIKO KUROKI, OF MONTEREY, CALIFORNIA.

FISH-BAIT.

1,235,331. Specification of Letters Patent. Patented July 31, 1917.

Application filed December 18, 1916. Serial No. 137,542.

*To all whom it may concern:*

Be it known that I, KAIKO KUROKI, a subject of the Emperor of Japan, residing at Monterey, in the county of Monterey and State of California, have invented new and useful Improvements in Fish-Baits, of which the following is a specification.

My invention relates to improvements in artificial baits for fish, one object of the invention being to provide an artificial bait which will greatly resemble the appearance of a small fish in motion, thereby rendering it very effective for hooking large fish which prey upon the smaller ones, and a further object being to provide such a bait which will be cheap and simple in construction.

Figure 1:
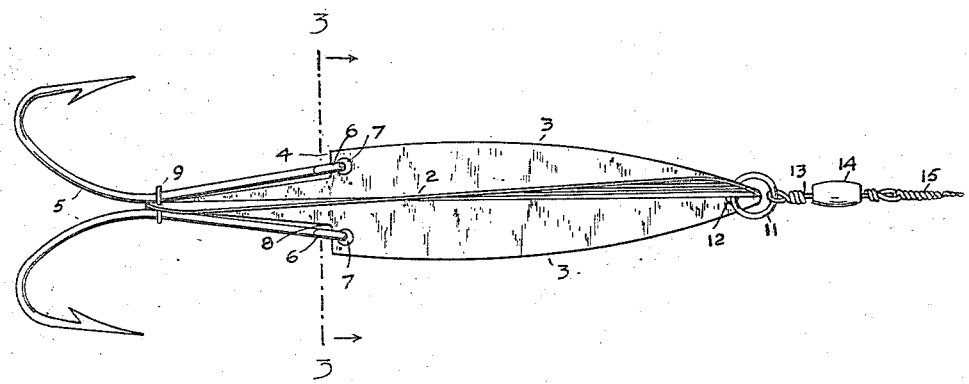
Figure 2:
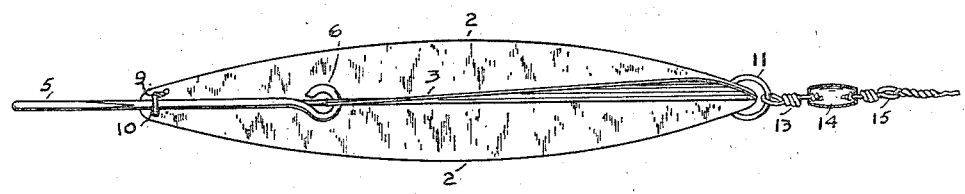
Figure 3:
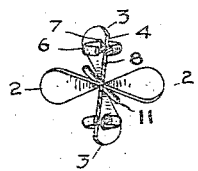

In the accompanying drawing, Figure 1 is a side view of my improved artificial bait; Fig. 2 is a plan view thereof; Fig. 3 is a horizontal section on the line 3—3 of Fig. 1.

Referring to the drawing, 1 indicates the main body of my improved artificial bait, which is preferably made of light colored and polished metal. It consists of four blades 2, 3, extending at right angles to each other from a central longitudinal axis. Each blade is twisted slightly with reference to said axis so as to have a general helical form, and the outer edges of the blades are, in general, of a flat elliptical form. Two of the blades 3, however, opposite to each other, are cut away, as shown at 4, from a point past the middle to the rear end, to accommodate hooks 5, the eyes 6 of said hooks being inserted through holes 7 in said blades 3 immediately in front of the shoulders 8 formed by the cut-away portions of the blades. The two hooks 5 are then tied in position extending back to back by means of a thin wire 9 passed around the shanks of said hooks and through holes 10 in the blades 2. A ring 11 is passed through a hole 12 in the front end of one of said blades, said ring being connected by a wire 13 to a swivel joint 14 which is connected by a wire 15 to the fishing line.

By reason of the swivel connection of the body of the bait with the fishing line, said body can rotate freely about its axis, and it is caused to rotate, when passing through the water, or when held stationary against a current of water flowing past it, by the spiral or oblique direction of the vanes or blades. The rapid rotation thus given to the body causes the bait to resemble in general a small fish in motion, while at the same time said rotation prevents a larger fish detecting the difference between the bait and the fish and also obscures the hooks upon the rear end of the bait. The bait is therefore very successful in catching fish.

At the same time it is very simple and cheap to manufacture.

I claim:—

1. A bait comprising a body portion composed of blades of sheet metal joined together, their inner edges forming the central longitudinal axis of the body, and the blades extending from said axis in helical form throughout the greater part of their length, whereby a rotary motion is imparted to said body by a longitudinal motion of the body in the water, and hooks secured to, and extending rearwardly from, certain of said blades.

2. A bait comprising a plurality of blades extending at uniform angular intervals from a central axis, longitudinally and obliquely to said axis, whereby a rotary motion is imparted to said body by a longitudinal relative movement of the body in the water, two of said blades being cut away at the rear end to accommodate hooks, and having holes in front of said cut-away portions, hooks having front portions engaging said holes, and means for tying rear portions of the hooks to the rear end of said body.

3. A bait comprising a plurality of blades extending at uniform angular intervals from a central axis, longitudinally and obliquely to said axis, whereby a rotary motion is imparted to said body by a longitudinal relative movement of the body in the water, two of said blades being cut away at the rear end to accommodate hooks, and having holes in front of said cut-away portions, hooks having front portions engaging said holes, the rear ends of the other blades having holes therethrough, and a wire extending through said holes and binding the rear portions of the hooks to said body.

K. KUROKI.